(12) United States Patent
Kayano et al.

(10) Patent No.: US 10,199,890 B2
(45) Date of Patent: Feb. 5, 2019

(54) EMBEDDED PERMANENT MAGNET ELECTRIC MOTOR

(75) Inventors: Shinsuke Kayano, Tokyo (JP); Masaya Inoue, Tokyo (JP); Shinji Nishimura, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 234 days.

(21) Appl. No.: 14/414,753

(22) PCT Filed: Sep. 7, 2012

(86) PCT No.: PCT/JP2012/072875
§ 371 (c)(1),
(2), (4) Date: Jan. 14, 2015

(87) PCT Pub. No.: WO2014/038062
PCT Pub. Date: Mar. 13, 2014

(65) Prior Publication Data
US 2015/0194849 A1    Jul. 9, 2015

(51) Int. Cl.
*H02K 1/27*    (2006.01)
*H02K 21/16*   (2006.01)
*H02K 29/03*   (2006.01)

(52) U.S. Cl.
CPC .......... *H02K 1/276* (2013.01); *H02K 1/2766* (2013.01); *H02K 21/16* (2013.01); *H02K 29/03* (2013.01); *H02K 2213/03* (2013.01)

(58) Field of Classification Search
CPC .... H02K 1/276; H02K 1/2766; H02K 1/2773; H02K 1/06
(Continued)

(56) References Cited

U.S. PATENT DOCUMENTS

2010/0156227 A1*  6/2010  Hung ............... H02K 21/16
                                                310/156.38
2011/0254474 A1   10/2011 Saito et al.

FOREIGN PATENT DOCUMENTS

JP    2002-058218 A    2/2002
JP    2002-252947 A    9/2002
(Continued)

OTHER PUBLICATIONS

International Search Report for PCT/JP2012/072875 dated Nov. 13, 2012.

*Primary Examiner* — Quyen P Leung
*Assistant Examiner* — Eric Johnson
(74) *Attorney, Agent, or Firm* — Sughrue Mion, PLLC; Richard C. Turner

(57) ABSTRACT

A rotor core is configured by arranging divided rotor cores coaxially so as to be in close contact with each other such that magnetic pole centers are aligned axially, auxiliary grooves are recessed into respective outer circumferential surfaces of the divided rotor cores between respective magnetic poles so as to have plane symmetry relative to a plane that includes a center position between the magnetic poles and a central axis of the divided rotor cores, and so as to extend from a first axial end to a second axial end of the divided rotor cores, the auxiliary grooves recessed into an outer circumferential surface of an identical divided rotor core have an identical groove shape, and groove widths of the auxiliary grooves are set such that predetermined orders of harmonic components of cogging torque that result from each of the divided rotor cores mutually cancel each other out.

2 Claims, 5 Drawing Sheets

(58) Field of Classification Search
USPC ......... 310/156.53, 156.56, 216.092–216.096
See application file for complete search history.

(56) References Cited

FOREIGN PATENT DOCUMENTS

| | | |
|---|---|---|
| JP | 3655205 B2 | 9/2002 |
| JP | 2004-048912 A | 2/2004 |
| JP | 2009-081909 A | 4/2009 |
| JP | 2010-098830 A | 4/2010 |
| JP | 2011-083188 A | 4/2011 |

* cited by examiner

EMBEDDED PERMANENT MAGNET ELECTRIC MOTOR

CROSS REFERENCE TO RELATED APPLICATIONS

This application is a National Stage of International Application No. PCT/JP2012/072875 filed Sep. 7, 2012, the contents of all of which are incorporated herein by reference in their entirety.

TECHNICAL FIELD

The present invention relates to an embedded permanent magnet electric motor in which permanent magnets are embedded near an outer circumferential side of a rotor core.

BACKGROUND ART

In recent years, in electric vehicles (EVs) and hybrid electric vehicles (HEVs), there is demand for electric motors that improve riding comfort by reducing electromagnetic vibrational forces, and that can also operate up to high-speed regions.

In consideration of such conditions, electric motors have been proposed in which electromagnetic vibrational force reducing grooves are formed on a surface of a rotor core so as to be positioned around an outer circumference of permanent magnets (see Patent Literature 1, for example).

In the electric motor that is described in Patent Literature 1, it is claimed that electromagnetic vibrational forces can be reduced by appropriately selecting a groove width of the electromagnetic vibrational force reducing grooves relative to a slit pitch and a slit width of the stator core, enabling noise to be reduced.

CITATION LIST

Patent Literature

Patent Literature 1: Japanese Patent No. 3655205 (Gazette)

SUMMARY OF THE INVENTION

Problem to be Solved by the Invention

In the electric motor that is described in Patent Literature 1, because the groove width of the electromagnetic vibrational force reducing grooves is constant in an axial direction, there is a limit to the reduction of the electromagnetic vibrational forces. Now, it is conceivable that the electromagnetic vibrational force-reducing effects could be increased by disposing a plurality of electromagnetic vibrational force reducing grooves for each magnetic pole. However, there are many shape parameters for significantly reducing the electromagnetic vibrational forces (such as groove width, number, groove position, etc.), and it is difficult to set the shape parameters optimally.

In the electric motor that is described in Patent Literature 1, because the electromagnetic vibrational force reducing grooves are not on a q axis (an axis that joins a center between magnetic poles and a central axis of a rotor core), one problem has been that q-axis inductance is increased, preventing operation up to high-speed regions.

In consideration of such conditions, the present applicants have found that the sign of higher-order harmonic components (electrical angles) of cogging torque can be inverted by changing a groove width of an auxiliary groove that is formed on an outer circumferential surface of the rotor core, and have succeeded in inventing the present invention.

The present invention aims to solve the above problems and an object of the present invention is to provide an embedded permanent magnet electric motor that can improve riding comfort by reducing electromagnetic vibrational forces that result from cogging torque, and that can operate up to high-speed regions by reducing q-axis inductance.

Means for Solving the Problem

In order to achieve the above object, according to one aspect of the present invention, there is provided an embedded permanent magnet electric motor including: a stator including: an annular stator core; and a stator coil that is mounted onto the stator core; and a rotor including: a rotor core that is disposed coaxially and rotatably on an inner circumferential side of the stator so as to ensure a predetermined gap between the rotor core and the stator core; and a plurality of permanent magnets that constitute magnetic poles, that are embedded near an outer circumference of the rotor core so as to be arranged circumferentially. The rotor core is configured by arranging a plurality of divided rotor cores coaxially so as to be in close contact with each other such that magnetic pole centers are aligned axially, and auxiliary grooves are recessed into respective outer circumferential surfaces of the plurality of divided rotor cores between respective magnetic poles so as to have plane symmetry relative to a plane that includes a center position between the magnetic poles and a central axis of the divided rotor cores, and so as to extend from a first axial end to a second axial end of the divided rotor cores. The auxiliary grooves that are recessed into an outer circumferential surface of an identical divided rotor core have an identical groove shape, and groove widths of the auxiliary grooves that are recessed into the outer circumferential surfaces of the plurality of divided rotor cores are set such that predetermined orders of harmonic components (electrical angles) of cogging torque that result from each of the plurality of divided rotor cores mutually cancel each other out.

Effects of the Invention

According to the present invention, because groove widths of the auxiliary grooves that are recessed into the outer circumferential surfaces of the plurality of divided rotor cores are set such that predetermined orders of harmonic components (electrical angles) of cogging torque that result from each of the plurality of divided rotor cores mutually cancel each other out, electromagnetic vibrational forces due to predetermined orders of harmonic components (electrical angles) of cogging torque are reduced. The riding comfort of EVs and HEVs that are equipped with the present electric motor can thereby be improved.

Because the auxiliary grooves that are formed on the outer circumferential surfaces of the plurality of divided rotor cores are always present between the magnetic poles, q-axis inductance is reduced. EVs and HEVs that are equipped with the present electric motor can thereby operate up to high-speed regions.

DESCRIPTION OF EMBODIMENTS

A preferred embodiment of an embedded permanent magnet electric motor according to the present invention will now be explained with reference to the drawings.

Embodiment 1

Figure 1:
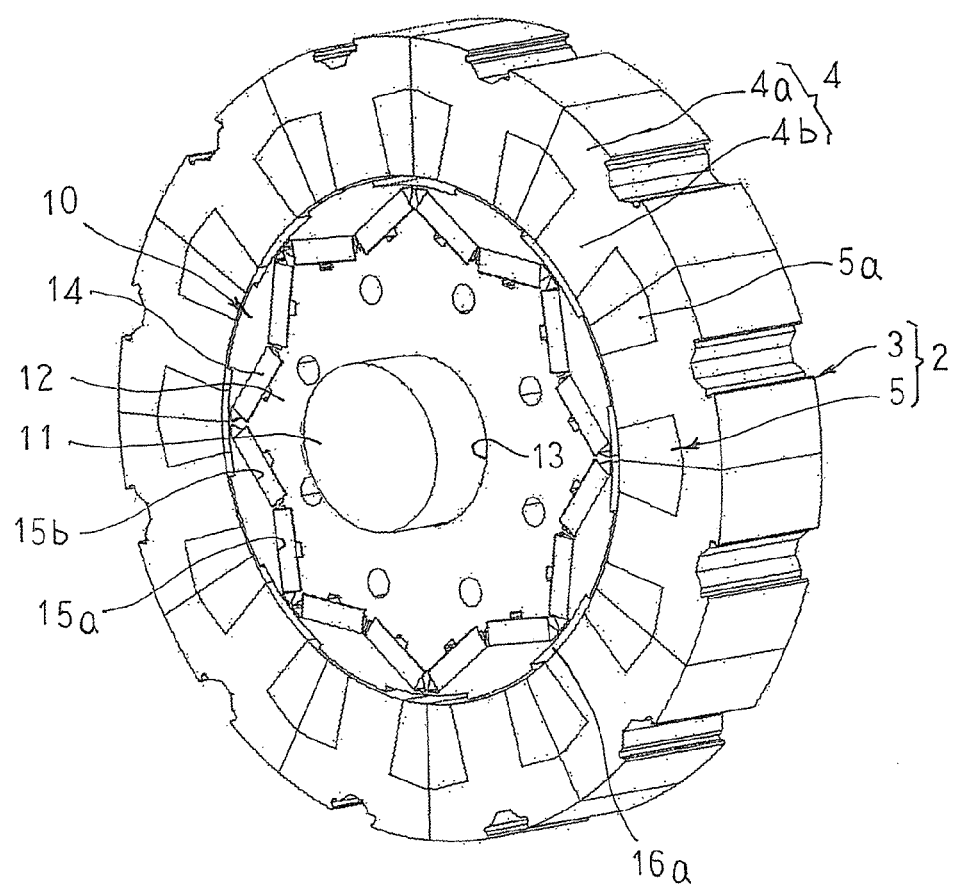
FIG. 1 is an oblique projection that shows an embedded permanent magnet electric motor according to Embodiment 1 of the present invention.
Figure 2:
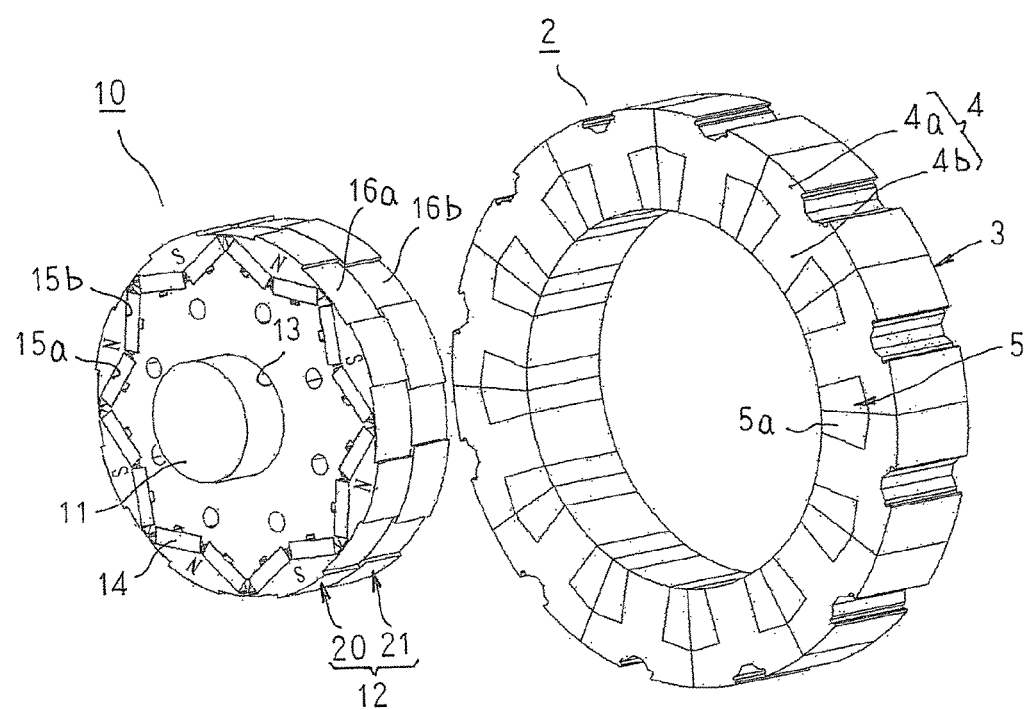
FIG. 2 is an exploded oblique projection that explains a configuration of the embedded permanent magnet electric motor according to Embodiment 1 of the present invention.
Figure 3:
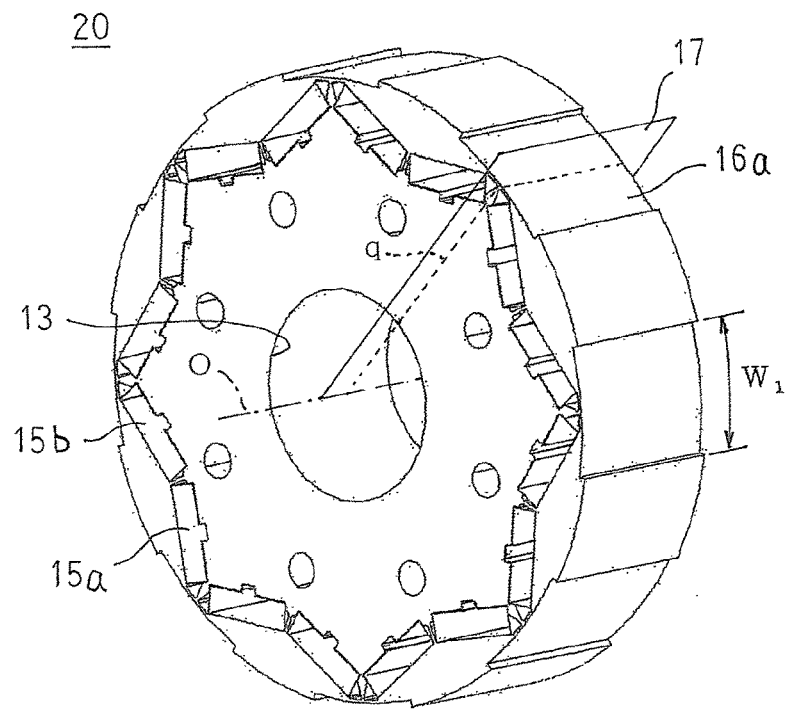
FIG. 3 is an oblique projection that shows a first divided rotor core that constitutes a rotor core in the embedded permanent magnet electric motor according to Embodiment 1 of the present invention.
Figure 4:
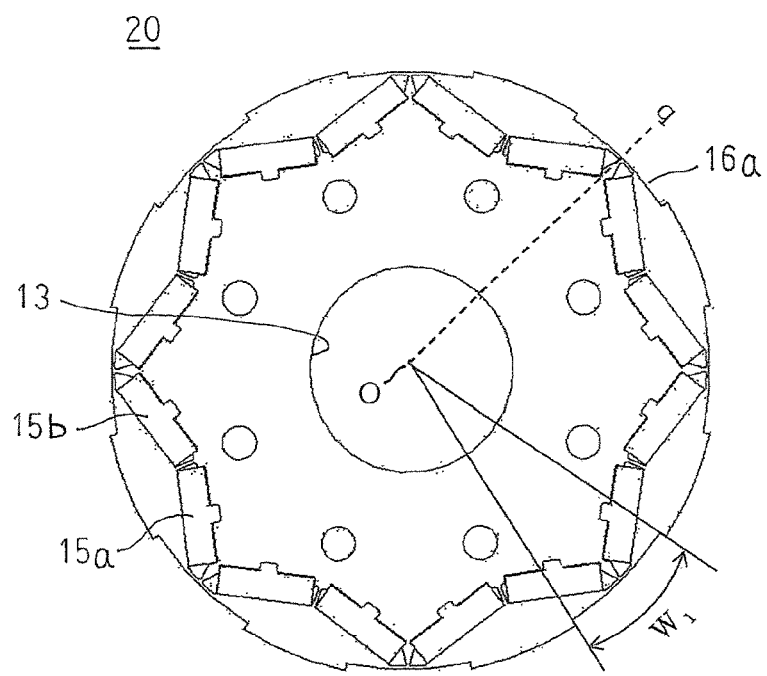
FIG. 4 is an end elevation that shows the first divided rotor core that constitutes the rotor core in the embedded permanent magnet electric motor according to Embodiment 1 of the present invention.
Figure 5:
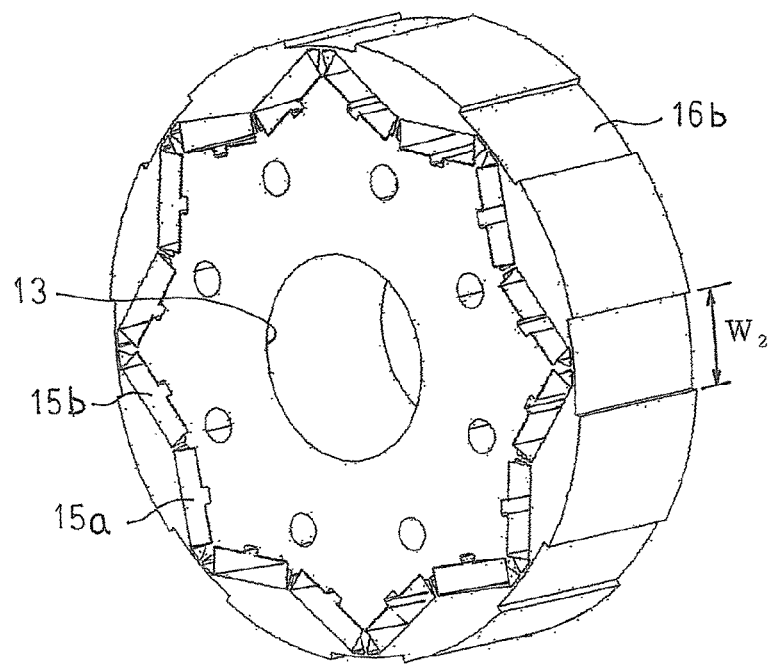
FIG. 5 is an oblique projection that shows a second divided rotor core that constitutes a rotor core in the embedded permanent magnet electric motor according to Embodiment 1 of the present invention.

FIG. 1 is an oblique projection that shows an embedded permanent magnet electric motor according to Embodiment 1 of the present invention, FIG. 2 is an exploded oblique projection that explains a configuration of the embedded permanent magnet electric motor according to Embodiment 1 of the present invention, FIG. 3 is an oblique projection that shows a first divided rotor core that constitutes a rotor core in the embedded permanent magnet electric motor according to Embodiment 1 of the present invention, FIG. 4 is an end elevation that shows the first divided rotor core that constitutes the rotor core in the embedded permanent magnet electric motor according to Embodiment 1 of the present invention, and FIG. 5 is an oblique projection that shows a second divided rotor core that constitutes a rotor core in the embedded permanent magnet electric motor according to Embodiment 1 of the present invention. Moreover, to facilitate explanation, coil ends are omitted in FIGS. 1 and 2.

In FIGS. 1 and 2, an embedded permanent magnet electric motor 1 includes: a stator 2 that has: an annular stator core 3; and a stator coil 5 that is mounted into the stator core 3, the stator 2 being held by a frame (not shown); and a rotor 10 that is fixed to a shaft 11 that is rotatably supported by the frame, the rotor 10 being disposed on an inner circumferential side of the stator 2 so as to ensure a predetermined gap between the rotor 10 and the stator core 3.

The stator core 3 is constituted by twelve core segments 4. Specifically, the core segments 4 are formed so as to have shapes that are obtained by dividing the stator core 3 into twelve equal sections circumferentially. The core segments 4 are produced by laminating and integrating a large number of electromagnetic steel plates that have been punched into identical shapes, for example, and have: a circular arc-shaped core back portion 4a; and a tooth 4b that is disposed so as to extend radially inward from a circumferential center of an inner circumferential surface of the core back portion 12.

Concentrated winding coils 5a are mounted onto the teeth 4b of the core segments 4. These concentrated winding coils 5a are configured by winding a conductor wire a predetermined number of times onto the teeth 4b of the core segments 4. Copper wire or aluminum wire, etc., that is coated with insulation is used as the conductor wire.

The core segments 4 onto which the concentrated winding coils 5a have been wound are arranged in an annular shape circumferentially by abutting together circumferential side surfaces of the core back portions 4a, and are press-fitted into and fixed to an annular ring body (not shown) to configure the stator 2.

Here, the core segments 4 are arranged into an annular shape by abutting circumferential side surfaces of the core back portions 4a to each other to configure the stator core 3. The core back portions 4a link circumferentially to configure the annular core back of the stator core 3, and spaces that are formed by the adjacent pairs of core segments 4 form slots. The stator coil 5 is constituted by AC-connecting the twelve concentrated winding coils 5a that are mounted onto the core segments 4. Moreover, portions of the concentrated winding coils 5a that protrude axially outward from the stator core 3 form coil ends (not shown) of the stator coil 5.

The rotor 10 includes: a rotor core 12; a shaft 11 that is press-fitted into and fixed to the shaft insertion aperture 13 that is formed so as to pass through a central position of the rotor core 12; and sixteen permanent magnets 14 that are each mounted so as to pass through near an outer circumferential side of the rotor core 12. The rotor core 12 is divided into two equal sections axially, namely a first divided rotor core 20 and a second divided rotor core 21. Eight pairs of circumferentially adjacent permanent magnets 14 are respectively disposed such that different magnetic poles alternate circumferentially.

Next, a configuration of the first divided rotor core 20 will be explained with reference to FIGS. 3 and 4.

The first divided rotor core 20 is produced into a cylindrical body at a central position of which a shaft insertion aperture 13 is formed, by laminating and integrating electromagnetic steel sheets that are punched out in predetermined shapes, for example. Eight pairs of magnet insertion apertures 15a and 15b are each formed at a uniform angular pitch circumferentially so as to have aperture shapes that have identical rectangular cross sections, and so as to pass through axially near an outer circumferential side of the first divided rotor core 20. The pairs of magnet insertion apertures 15a and 15b are disposed in V shapes that open radially outward from a central axis O. In addition, eight first auxiliary grooves 16a are each recessed into an outer circumferential surface of the first divided rotor core 20 at a uniform angular pitch so as to extend from a first axial end to a second axial end of the first divided rotor core 20 so as to have a groove shape that has an identical rectangular cross section. The first auxiliary grooves 16a have a groove width W1, and are configured so as to have plane symmetry relative to a plane 17 that passes through a center between the pairs of adjacent magnet insertion apertures 15a and 15b (between the magnetic poles) and a central axis. Moreover, the plane 17 is a plane that is formed by a q axis.

Next, a configuration of the second divided rotor core 21 will be explained with reference to FIG. 5.

The second divided rotor core 21 is produced into a cylindrical body at a central position of which a shaft insertion aperture 13 is formed, by laminating and integrating electromagnetic steel sheets that are punched out in predetermined shapes, for example. Eight pairs of magnet insertion apertures 15a and 15b are each formed at a uniform angular pitch circumferentially so as to have aperture shapes that have identical rectangular cross sections, and so as to pass through axially near an outer circumferential side of the second divided rotor core 21. The pairs of magnet insertion apertures 15a and 15b are disposed in V shapes that open radially outward from a central axis O. In addition, eight second auxiliary grooves 16b are each recessed into an outer circumferential surface of the second divided rotor core 21 at a uniform angular pitch so as to extend from a first axial end to a second axial end of the second divided rotor core 21 so as to have a groove shape that has an identical rectangular cross section. The second auxiliary grooves 16b have a groove width W2, and are configured so as to have plane symmetry relative to a plane 17. Moreover, the second divided rotor core 21 is formed so as to have an identical shape to that of the first divided rotor core 20 except that the groove width W2 of the second auxiliary grooves 16b is different than the groove width W1 of the first auxiliary grooves 16a.

The first divided rotor core 20 and the second divided rotor core 21 that are configured in this manner are disposed coaxially so as to be placed in close contact such that q axes are aligned axially. Thus, the shaft insertion apertures 13 of the first divided rotor core 20 and the second divided rotor core 21 communicate with each other, and the magnet insertion apertures 15a and 15b of the first divided rotor core 20 and the second divided rotor core 21 communicate with each other. The shaft 11 is press-fitted into the shaft insertion apertures 13 of the first divided rotor core 20 and the second divided rotor core 21 to configure the rotor core 12. In addition, a permanent magnet 14 is inserted into and fixed to each of the magnet insertion apertures 15a and 15b to configure a rotor 10. Permanent magnets 14 that are magnetized so as to have reverse polarity are inserted into adjacent pairs of the magnet insertion apertures 15a and 15b such that outer circumferential sides of the pairs of magnet insertion apertures 15a and 15b form salient poles. The number of poles in the rotor 10 is eight.

The embedded permanent magnet motor 1 that is configured in this manner operates as an eight-pole, twelve-slot inner-rotor synchronous motor when electricity is supplied to the stator coil 5 from an external electric power supply.

In this embedded permanent magnet electric motor 1, the rotor core 12 is configured by arranging the first divided rotor core 20 and the second divided rotor core 21 coaxially so as to be placed in close contact with each other. Eight first auxiliary grooves 16a that have a groove width W1 are recessed into the outer circumferential surface of the first divided rotor core 20 at a uniform angular pitch. Eight second auxiliary grooves 16b that have a groove width W2 (≠W1) are recessed into the outer circumferential surface of the second divided rotor core 21 at a uniform angular pitch.

Here, as described below, the groove widths W1 and W2 of the first auxiliary grooves 16a and the second auxiliary grooves 16b are set such that the signs of the sixth-order and twelfth-order harmonic components (electrical angles) of cogging torque due to the first divided rotor core 20 and of the sixth-order and twelfth-order harmonic components (electrical angles) of cogging torque due to the second divided rotor core 21 are inverted. Moreover, an electrical angle is an angle in which one magnetic pole pair portion is represented as one period (360 degrees).

Thus, the sixth-order and twelfth-order harmonic components (electrical angles) of cogging torque that result from the first auxiliary grooves 16a of the first divided rotor core 20 and the sixth-order and twelfth-order harmonic components (electrical angles) of cogging torque that result from the second auxiliary grooves 16b of the second divided rotor core 21 are canceled out, or cancel each other out, reducing electromagnetic vibrational forces. The riding comfort of EVs and HEVs that are equipped with the present embedded permanent magnet electric motor 1 can thereby be improved.

The first auxiliary grooves 16a and the second auxiliary grooves 16b are formed so as to have plane symmetry relative to planes 17 that are formed by the q axes. Thus, because the first auxiliary grooves 16a and the second auxiliary grooves 16b are always formed between the magnetic poles, q-axis inductance is reduced. Moreover, q-axis inductance is the ease of passage of magnetic flux flowing in the direction of the q axis. EVs and HEVs that are equipped with the present embedded permanent magnet electric motor 1 can thereby be operated up to high-speed regions.

The first auxiliary grooves 16a and the second auxiliary grooves 16b are formed on the first divided rotor core 20 and the second divided rotor core 21. Thus, reductions in the weight of the rotor core 12 can be achieved. The area of the outer circumferential surface of the rotor core 12 that faces an inner circumferential surface of the stator core 3 is also increased, cooling the rotor 10 efficiently.

Next, effects according to the present invention that reduce electromagnetic vibrational force will be explained based on magnetic field analysis on an electric motor model that uses a rotor core in which the number of axial divisions is one.

The electric motor model used a stator core that had an outside diameter of ϕ138 mm, and an inside diameter of ϕ91 mm, used a rotor core that had an outside diameter of ϕ90 mm, an inside diameter of ϕ30 mm, an axial length of 25 mm, and in which the number of axial divisions was one, and used permanent magnets that had a residual magnetic flux density of 1.1 T. Auxiliary grooves were formed so as to have plane symmetry relative to each of the planes 17, and groove depth was set to 1 mm.

Figure 6:
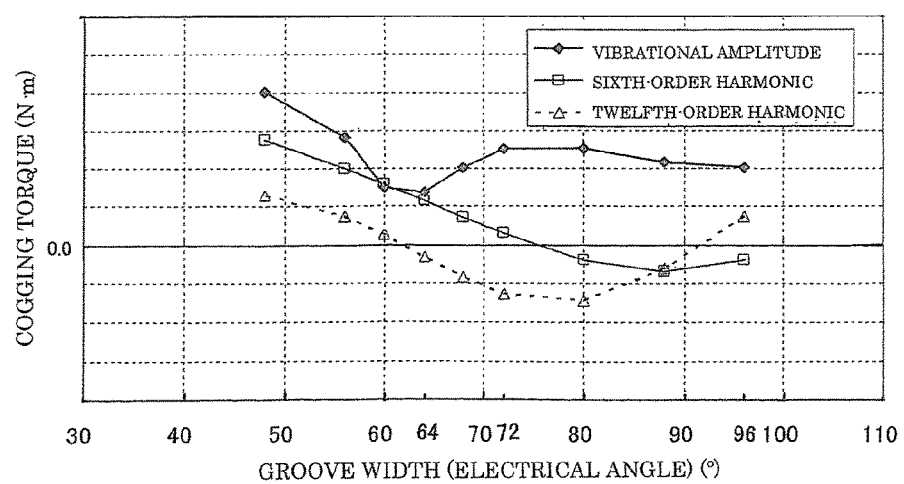
FIG. 6 is a graph that shows results of magnetic field analysis of cogging torque using different auxiliary groove widths in an electric motor model.

Results of magnetic field analysis of cogging torque using different auxiliary groove widths in the electric motor model are shown in FIG. 6. Moreover, the groove widths are expressed as electrical angles.

From FIG. 6, it was ascertained that vibrational amplitude of the cogging torque is changed by changing the auxiliary groove width, and that vibrational amplitude of the cogging torque is minimized when the auxiliary groove width is 64 degrees.

From FIG. 6, it was ascertained that the sixth-order and twelfth-order harmonic components (electrical angles) of the cogging torque are change by changing the auxiliary groove width. It was found that the sign of the sixth-order harmonic component (electrical angle) of the cogging torque is inverted when the groove width is around approximately 75 degrees. It was also found that the sign of the twelfth-order harmonic component (electrical angle) of the cogging torque is inverted in a range in which the groove width is from approximately 62 degrees to approximately 92 degrees compared to ranges in which the groove width is less than or equal to approximately 62 degrees or greater than or equal to approximately 92 degrees. In addition, it was found that the signs of the sixth-order and twelfth-order harmonic components (electrical angles) of the cogging torque are both inverted when the groove width is 96 degrees and when the groove width is 72 degrees.

Figure 7:
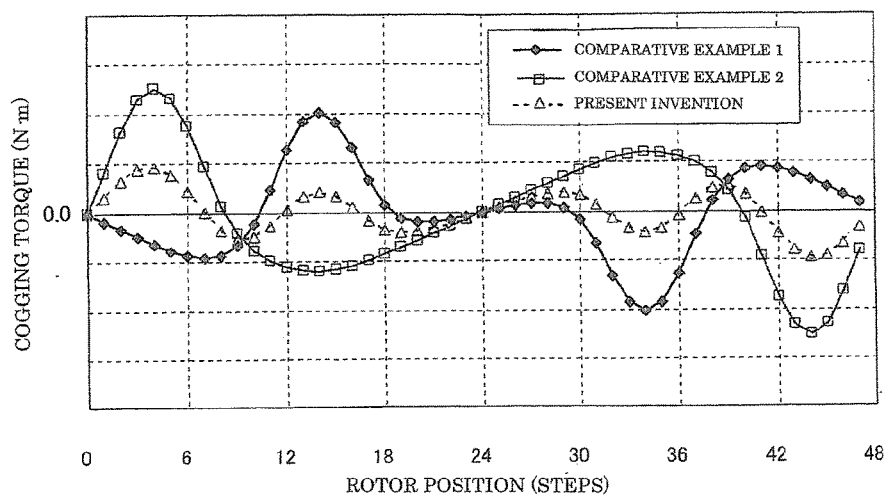
FIG. 7 is a graph that shows results of magnetic field analysis of cogging torque using different rotor positions in the electric motor model.

Next, results of magnetic field analyses on cogging torque using different rotor positions performed on an electric motor model that used a rotor core in which the number of axial sections was one, and in which the auxiliary groove width was 96 degrees (Comparative Example 1), an electric motor model that used a rotor core in which the number of axial sections was one, and in which the auxiliary groove width was 72 degrees (Comparative Example 2), and an electric motor model that used a rotor core that is constituted by a first divided rotor core in which the auxiliary groove width is 96 degrees and a second divided rotor core in which the auxiliary groove width is 72 degrees (the present invention) are shown in FIG. 7. Moreover, In FIG. 7, forty-eight steps on the horizontal axis correspond to one sixth of the electrical period. Axial length of the first and second divided rotor cores is 12.5 mm. Thus, the number of equal axial sections of the rotor core according to the present invention is two.

From FIG. 7, it has been possible to confirm that the present invention was able to reduce cogging torque significantly compared to Comparative Examples 1 and 2. In the present invention, the rotor core is constituted by a first divided rotor core in which the auxiliary groove width is 96 degrees and a second divided rotor core in which the auxiliary groove width is 72 degrees. As can be seen from FIG. 6, the signs of the sixth-order and twelfth-order harmonic components (electrical angles) of the cogging torque are both inverted when the groove width is 96 degrees and when the groove width is 72 degrees. Thus, the sixth-order harmonic component (electrical angle) that results from the first divided rotor core, in which the auxiliary groove width is 96 degrees, and the sixth-order harmonic component (electrical angle) that results from the second divided rotor core 21, in which the auxiliary groove width is 72 degrees, were canceled out, or canceled each other out. The twelfth-order harmonic component (electrical angle) that results from the first divided rotor core, in which the auxiliary groove width is 96 degrees, and the twelfth-order harmonic component (electrical angle) that results from the second divided rotor core 21, in which the auxiliary groove width is 72 degrees, were also canceled out, or canceled each other out. It can be inferred that the present invention was thereby able to reduce cogging torque significantly compared to Comparative Examples 1 and 2.

Figure 8:
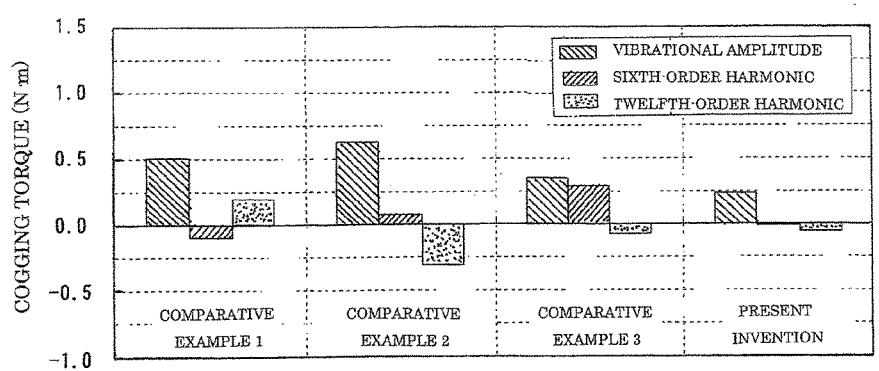
FIG. 8 is a graph that shows results of analysis of cogging torque frequency components in the electric motor model.

Next, results of performing cogging torque frequency component analysis on Comparative Examples 1, 2, and 3 and on the present invention are shown in FIG. 8. Moreover, Comparative Example 3 is an electric motor model that used a rotor core in which the number of axial sections was one, and in which the auxiliary groove width was 64 degrees.

From FIG. 8, it has been possible to confirm that the present invention can reduce cogging torque even compared to Comparative Example 3 in which the auxiliary groove width was 64 degrees, at which cogging torque was already minimized.

Thus, it has been possible to confirm that if focus is placed on predetermined orders of the harmonic components (electrical angles) of cogging torque, and auxiliary groove widths of a first divided rotor core and a second divided rotor core are set to groove widths at which the signs of the predetermined orders of the harmonic components (electrical angles) are inverted, the predetermined orders of the harmonic components (electrical angles) that result from the first and second divided rotor cores mutually cancel each other out, enabling electromagnetic vibrational forces due to the predetermined orders of the harmonic components (electrical angles) to be reduced.

Moreover, in Embodiment 1 above, electromagnetic vibrational forces due to the sixth-order and twelfth-order harmonic components (electrical angles) of the cogging torque are reduced, but the configuration may be such that the electromagnetic vibrational forces due to the sixth-order harmonic component (electrical angle) of the cogging torque or the electromagnetic vibrational forces due to the twelfth-order harmonic component (electrical angle) are reduced. In other words, the auxiliary groove widths of the first divided rotor core and the second divided rotor core need only be set to groove widths at which the signs of predetermined orders of the harmonic components (electrical angles) are inverted to reduce electromagnetic vibrational forces due to the predetermined orders of the harmonic components (electrical angles).

Furthermore, if the reducing effects on the electromagnetic vibrational forces due to the predetermined orders of the harmonic components (electrical angles) are insufficient using two auxiliary grooves that have different groove widths, then the number of equal axial sections in the rotor core should be set to three, for example, and three auxiliary groove widths set such that the predetermined orders of the harmonic components (electrical angles) that result from the respective divided rotor cores cancel each other out mutually.

In Embodiment 1 above, an eight-pole, twelve-slot rotary electric machine has been explained, but it goes without saying that the number of poles and the number of slots are not limited to eight poles and twelve slots.

In Embodiment 1 above, pairs of permanent magnets that constitute magnetic poles are disposed in V shapes that open radially outward from a central axis, but arrangement of the permanent magnets is not limited thereto. For example, the respective permanent magnets may also be disposed at a uniform angular pitch circumferentially such that the permanent magnets contact an identical cylindrical surface to constitute magnetic poles.

The invention claimed is:

1. An embedded permanent magnet electric motor comprising:
   a stator including:
   an annular stator core; and
   a stator coil that is mounted onto said stator core; and
   a rotor including:
   a rotor core that is disposed coaxially and rotatably on an inner circumferential side of said stator so as to ensure a predetermined gap between said rotor core and said stator core; and
   a plurality of permanent magnets that constitute magnetic poles, that are embedded near an outer circumference of said rotor core so as to be arranged circumferentially, wherein:
   said rotor core is configured by arranging two divided rotor cores coaxially so as to be in close contact with each other such that magnetic pole centers are aligned axially;
   auxiliary grooves are recessed into respective outer circumferential surfaces of said two divided rotor cores between respective magnetic poles so as to have plane symmetry relative to a plane that includes a center position between said magnetic poles and a central axis of said two divided rotor cores, and so as to extend from a first axial end to a second axial end of said two divided rotor cores;
   said auxiliary grooves that are recessed into an outer circumferential surface of an identical divided rotor core have an identical groove shape;
   groove widths of said auxiliary grooves that are recessed into said outer circumferential surfaces of said two divided rotor cores are set such that signs of a sixth-order harmonic component of cogging torque that results from a first of said two divided rotor cores and of a sixth-order harmonic component of cogging torque that results from a second of said two divided rotor cores are inverted, and signs of a twelfth-order harmonic component of cogging torque that results from said first of said two divided rotor cores and of a twelfth-order harmonic component of cogging torque that results from said second of said two divided rotor cores are inverted;

said groove widths of said auxiliary grooves that are recessed into said outer circumferential surface of said first of said two divided rotor cores are set to be larger than an electrical angle of 62 degrees and less than an electrical angle of 75 degrees, and said groove widths of said auxiliary grooves that are recessed into said outer circumferential surface of said second of said two divided rotor cores are set to be larger than an electrical angle of 92 degrees.

2. The embedded permanent magnet, electric motor according to claim 1, wherein:

an axial width of each of the two divided rotor cores is the same.

* * * * *